US009742216B2

United States Patent
Hur et al.

(10) Patent No.: US 9,742,216 B2
(45) Date of Patent: Aug. 22, 2017

(54) WIRELESS CHARGING SYSTEM FOR VARIABLE CHARGING MODE

(71) Applicants: HYUNDAI MOTOR COMPANY, Seoul (KR); Kia Motors Corporation, Seoul (KR); LG INNOTEK CO., LTD., Seoul (KR)

(72) Inventors: Nam Woong Hur, Hwaseong-si (KR); Sin Gu Kim, Suwon-si (KR); Seul Ki Jeon, Gunsan-si (KR); Jeong Nam Son, Suwon-si (KR); Woo Kil Jung, Suwon-si (KR); Yun Bok Lee, Seoul (KR); Yong Suk Chae, Anyang-si (KR)

(73) Assignees: Hyundai Motor Company, Seoul (KR); Kia Motors Corporation, Seoul (KR); LG Innotek Co., Ltd., Seoul (KR)

(*) Notice: Subject to any disclaimer, the term of this patent is extended or adjusted under 35 U.S.C. 154(b) by 32 days.

(21) Appl. No.: 14/570,875

(22) Filed: Dec. 15, 2014

(65) Prior Publication Data
US 2016/0064997 A1    Mar. 3, 2016

(30) Foreign Application Priority Data
Aug. 27, 2014    (KR) .......................... 10-2014-0112416

(51) Int. Cl.
G06F 17/50    (2006.01)
H02J 7/04    (2006.01)
(Continued)

(52) U.S. Cl.
CPC ................ *H02J 7/04* (2013.01); *H02J 7/025* (2013.01); *H04B 5/0037* (2013.01); *H04B 5/0081* (2013.01)

(58) Field of Classification Search
CPC ...................................................... H02J 7/025
(Continued)

(56) References Cited

U.S. PATENT DOCUMENTS 8,185,092 B1* 5/2012 Durig ................... H04W 48/16
455/127.4
2010/0253281 A1    10/2010 Li
(Continued)

FOREIGN PATENT DOCUMENTS

JP    2006-128029 A    5/2006
JP    2006-309977 A    11/2006
(Continued)

OTHER PUBLICATIONS

Korean Office Action issued in Application No. 10-2014-0112416 dated Jan. 8, 2016, with English translation.
Korean Decision of Rejection issued in Application No. 10-2014-0112416 dated Jul. 1, 2016 with English translation.

*Primary Examiner* — Suresh Memula
(74) *Attorney, Agent, or Firm* — McDermott Will & Emery LLP

(57) ABSTRACT

A wireless charging system for a variable charging mode includes: an information receiver configured to receive information about a wireless power receiver including a wireless charging mode that is supported by the wireless power receiver through a wireless communication connected to the wireless power receiver; wireless power transmitting units configured to wirelessly transmit power by a plurality of different wireless charging modes; and a controller configured to control the wireless power transmitting units to wireless transmit power by the wireless charging mode corresponding to the received information.

10 Claims, 2 Drawing Sheets

(51) Int. Cl.
*H02J 7/02* (2016.01)
*H04B 5/00* (2006.01)

(58) Field of Classification Search
USPC .......................................................... 320/108
See application file for complete search history.

(56) References Cited

U.S. PATENT DOCUMENTS

| 2012/0306285 | A1 | 12/2012 | Kim et al. |
| 2013/0214612 | A1 | 8/2013 | Bae |
| 2013/0313910 | A1 | 11/2013 | Sasaki |
| 2014/0210406 | A1* | 7/2014 | Na .......................... H02J 7/025 320/108 |
| 2015/0065041 | A1 | 3/2015 | Ahn |

FOREIGN PATENT DOCUMENTS

| JP | 2013-172640 A | 9/2013 |
| JP | 2013-247707 A | 12/2013 |
| JP | 2014-033534 A | 2/2014 |
| KR | 10-2012-0005484 A | 1/2012 |
| KR | 10-2012-0047027 A | 5/2012 |
| KR | 10-2012-0085498 A | 8/2012 |
| KR | 10-1192665 B1 | 10/2012 |
| KR | 10-2012-0135085 A | 12/2012 |
| KR | 10-2013-0128514 A | 11/2013 |
| KR | 10-2014-0024517 A | 3/2014 |
| KR | 10-2014-0076486 | 6/2014 |
| KR | 10-2015-0077884 A | 7/2015 |

* cited by examiner

WIRELESS CHARGING SYSTEM FOR VARIABLE CHARGING MODE

CROSS-REFERENCE TO RELATED APPLICATION

This application is based on and claims the benefit of priority to Korean Patent Application No. 10-2014-0112416, filed on Aug. 27, 2014 in the Korean Intellectual Property Office, the disclosure of which is incorporated herein in its entirety by reference.

TECHNICAL FIELD

The present disclosure relates to a wireless charging system, and more particularly, to a wireless charging system for a variable charging mode capable of transmitting power in the corresponding charging mode depending on wireless charging standard information applied to a user mobile terminal.

BACKGROUND

A wireless charging technology is a technology of transmitting power required to wirelessly charge a battery without using a power supply code or a charging connector.

Recently, with an explosive increase in a smart phone market, a use of a wireless charging technology has been accelerated. The smart phone enables a user to freely enjoy abundant contents and multimedia any time, but has a short use time due to a restriction of battery capacity. The environment of the wireless charging technology in a smart phone market has been greatly changed with the appearance of a wireless charging correspondence smart phone from 2010, and products with a wireless charging module for the purpose of wirelessly charging a mobile phone and a smart phone have been continuously published at home and abroad in 2011. In addition, an electric toothbrush, an electric razor, or the like are charged based on an electromagnetic induction principle. Recently, wireless charging products that may charge mobile devices, such as a mobile phone, a PDA, an MP3 player, and a notebook computer, using the electromagnetic induction have been released.

Among the wireless charging modes, a magnetic induction mode that induces a current from one coil to another coil through a magnetic field is very sensitive to a distance and a relative position between the coils and therefore has suddenly reduced transmission efficiency even though the two coils have a slight distance from each other or deviate from each other. Therefore, there is a problem in that the charging system based on the magnetic induction mode may be used only in a close range of several centimeters (cm) or less.

Meanwhile, as another mode, there is a non-radial energy transfer mode based on coupling of attenuation waves of a resonance field. The non-radial energy transfer mode uses the fact that two resonators having the same frequency do not affect other non-resonators therearound but have a tendency to be coupled with each other. As a result, the non-radial energy transfer mode has been introduced as a technology of transferring energy to a farther distance than the typical electromagnetic induction mode.

As such, a wireless power transmitter needs to provide an appropriate charging mode conforming to a mode which is supported by a power receiving apparatus among different charging modes.

SUMMARY

The present disclosure has been made to solve the above-mentioned problems occurring in the prior art while advantages achieved by the prior art are maintained intact.

An aspect of the present disclosure provides a wireless charging system for a variable charging mode to enable a wireless power transmitter to automatically transmit wirelessly power to a wireless power receiver carried by a user depending on the most efficient charging mode even though the user does not know the wireless charging mode that is supported by the wireless power receiver.

According to an exemplary embodiment of the present disclosure, a wireless charging system for a variable charging mode includes: information receivers configured to receive information on a wireless power receiver including a wireless charging mode that is supported by the wireless power receiver through wireless communication connected to the wireless power receiver; wireless power transmitting units configured to wirelessly transmit power by a plurality of different wireless charging modes; and a controller configured to control the wireless power transmitting units to wirelessly transmit power by the wireless charging mode corresponding to the received information.

The wireless power transmitting units may include wireless power transmitters configured to wirelessly transmit power depending on at least two wireless charging modes of a wireless power consortium (WPC) mode, a power matters alliance (PMA) mode, and an alliance for wireless power (A4WP) mode, which are included in a wireless charging standard; and a switching unit configured to switch the wireless charging mode to one of the at least two wireless charging modes depending on a control of the controller.

When the wireless charging mode switched by the switching unit is the WPC and the PMA, the wireless charging mode may use ping of in-band communication to sense whether the wireless power receiver contacts the wireless power transmitting units and a state of the wireless power receiver and the wireless power transmitting units to wirelessly transmit power.

When the wireless charging mode switched by the switching unit is the A4WP, the wireless charging mode may use Bluetooth low energy (BLE) to provide a communication between the wireless power receiver and the wireless power transmitting units.

The wireless power receiver may be a mobile terminal carried by a passenger of a vehicle, the information receiver may include a head unit and a receiver that are equipped in the vehicle, the controller may be a micro controller unit (MCU) that is equipped in the vehicle, and the head unit may transmit the information received from the receiver to the MCU through vehicle communication CAN/LIN.

The wireless communication connected to the wireless power receiver may be a Bluetooth communication or a WiFi communication.

The wireless power receiver may be a mobile terminal carried by a passenger of a vehicle, the information receiver may include a near field communication (NFC) reader in the vehicle, the controller may be a micro controller unit (MCU) that is equipped in the vehicle, and the mobile terminal may include application using NFC communication to transmit the information.

The charging mode corresponding to the received information may be A4WP, and when pairing of the A4WP fails, power may be wirelessly transmitted by pairing through the NFC using the NFC reader and the application.

When the wireless power receiver supports a plurality of different wireless charging modes, the controller may control the wireless power transmitting units to sequentially apply the plurality of different wireless charging modes based on preset priority to wirelessly transmit power to the wireless power receivers.

The wireless charging system may further include: a memory unit configured to store wireless transmission efficiency, wherein the controller may be configured depending on the plurality of different modes to calculate the wireless transmission efficiency of power wirelessly transmitted.

When the information receiver receives the information on the wireless power receiver corresponding to the wireless transmission efficiency stored in the memory unit, the controller may control the wireless power transmitting units to wirelessly transmit power to the wireless power receivers by the wireless charging mode having highest wireless transmission efficiency among the plurality of different wireless charging modes based on the wireless transmission efficiency stored in the memory unit.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
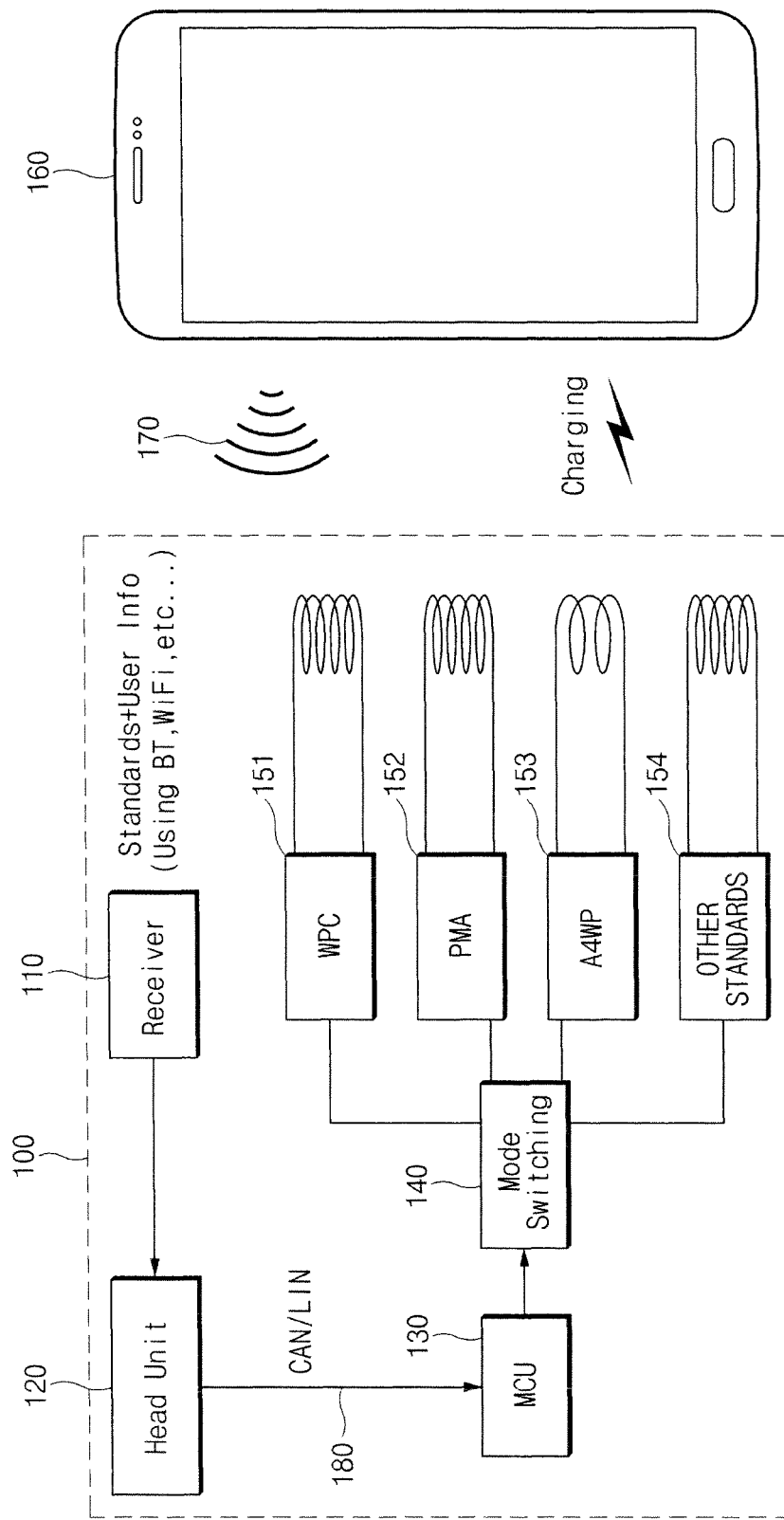
FIG. 1 is a block diagram illustrating a wireless charging system for a variable charging mode according to an exemplary embodiment of the present disclosure.

Advantages and features of the present disclosure and methods to achieve them will be elucidated from exemplary embodiments described below in detail with reference to the accompanying drawings. However, the present disclosure is not limited to the exemplary embodiments set forth herein, but may be modified in many different forms. However, these exemplary embodiments are provided so that this disclosure will be thorough and complete, and will fully convey the technical spirit of the disclosure to those skilled in the art.

In the drawings, the exemplary embodiments of the present disclosure are not limited to the illustrated specific form, but in order to clearly understand and/or easily embody the present disclosure, configurations of the present disclosure will be enlarged in the accompanying drawings. Herein, specific terms have been used, but are just used for the purpose of describing the present disclosure and are not used for qualifying the meaning or limiting the scope of the present disclosure, which is disclosed in the appended claims.

In the present specification, terms 'and/or' are used as meaning including at least one of components arranged after and before any component. Further, expression 'connected/coupled' is used as a meaning including a case in which the parts are directly connected with each other and a case in which the parts are indirectly connected with each other with other elements interposed therebetween. Unless explicitly described alternatively, a singular form includes a plural form in the present specification. In addition, components, steps, operations, and/or elements mentioned in the present specification mentioned as "comprising" or "consisting" do not exclude the existence or addition of one or more other components, steps, operations, and/or elements.

Hereinafter, exemplary embodiments of the present disclosure will be described in detail with reference to the accompanying drawings.

FIG. 1 is a block diagram illustrating a wireless charging system for a variable charging mode according to an exemplary embodiment of the present disclosure. Referring to FIG. 1, a wireless charging system 100 for a variable charging mode includes information a receiver 110 and a head unit 120, wireless power transmitting units 140, 151, 152, 153, and 154, a controller 130, and a charging mode switching unit 140.

The information receiver 110 and head unit 120 are connected to a wireless power receiver 160 through wireless communication 170 and receive information about a wireless charging mode, which is supported by the wireless power receiver 160 through the connected wireless communication 170. Here, the received information may include the information on the wireless charging mode, which is supported by the wireless power receiver 160 and large-capacity user/mobile data of the wireless power receiver 160. Further, the wireless communication 170 connected between the wireless power receiver 160 and the information receivers 110 and head unit 120 may be Bluetooth communication or WiFi communication.

The charging mode switching unit 140 and wireless power transmitting units 151, 152, 153, and 154 wirelessly transmit power to the wireless power receiver 160 by a plurality of different wireless charging modes. To this end, the wireless power transmitting units 151, 152, 153, and 154 may include a plurality of wireless power transmitters (not shown), which are implemented by different modes. In detail, the wireless power transmitting units 151, 152, 153, and 154 may include wireless power transmitters that wirelessly transmit power depending on at least two charging modes of a wireless power consortium (WPC) mode, a power matters alliance (PMA) mode, and an alliance for wireless power (A4WP) mode, which are included in a wireless charging standard. The charging mode switching unit 140 is configured to switch and select any one of the different wireless charging modes.

The controller 130 controls the charging mode switching unit 140 and the wireless power transmitting units 151, 152, 153, and 154 to wirelessly transmit power to the wireless power receiver 160 by the corresponding wireless charging mode, based on information on the wireless charging modes that are received by the information receiver 110 and head unit 120 and supported by the wireless power receiver 160. That is, even though the user of the wireless power receiver 160 does not know the wireless charging mode applied to his/her own devices, the controller 130 controls the wireless charging system that may perform the wireless charging of various modes based on the information received through the wireless communication 170 to be able to wirelessly transmit power by the wireless charging mode suitable for the corresponding device.

When the wireless charging mode switched by the switching unit 140 depending on the control of the controller 130 is the WPC and the PMA, the wireless charging mode uses ping of in-band communication to sense whether the wireless power receiver 160 contacts the wireless power transmitting units 151, 152, 153, and 154 and a state of the wireless power receiver 160 and the wireless power transmitting units 151, 152, 153, and 154, thereby wirelessly transmitting power.

Further, when the wireless charging mode switched by the switching unit 140 is the A4WP, the wireless charging mode uses Bluetooth low energy (BLE) to provide a communication between the wireless power receiver 160 and the wireless power transmitting units 151, 152, 153, and 154.

Further, when the wireless charging system 100 for a variable charging mode according to the exemplary embodiment of the present disclosure is applied to the wireless charging system of a vehicle, the wireless power receiver 160 may be mobile terminals carried by passengers of the vehicle and the information receiver 110 and the head unit 120 may be an infortainment system, which is equipped in the corresponding vehicle. In an exemplary embodiment, the head unit 120 included in the infortainment system may be included in the information receiver 120. Further, the controller 130 may be a micro controller unit (MCU) which is equipped in the vehicle. Here, the head unit 120 may transmit the information on the mobile terminal 160 received from the receiver 110 to the MCU 130 through a vehicle communication (CAN/LIN) 180, and the MCU 130 may control the switching unit 140 based on the information to select a specific wireless charging mode.

Further, the wireless charging system 100 for a variable charging mode according to the exemplary embodiment of the present disclosure may be applied even to the case in which the wireless power receiver 160 does not support a single wireless charging mode but supports the plurality of different wireless charging modes.

In this case, the controller 130 sequentially applies the plurality of different wireless charging modes based on priority that is preset by a user or a manufacturer to be able to wirelessly transmit power to the wireless power receiver 160.

In detail, when the specific wireless charging mode among the plurality of different wireless charging modes is applied depending on a state (distance and position) in which the wireless power receiver 160 is supported, and the like, wireless charging efficiency may be highest. That is, the controller 130 is configured depending on the plurality of different wireless charging modes to be able to calculate wireless transmission efficiency of power wirelessly transmitted so that the wireless charging system is operated depending on the wireless charging mode having the highest wireless charging efficiency and a memory unit (not shown) in which the calculated wireless transmission efficiency is stored may be included in the wireless charging system 100 for a variable charging mode according to the exemplary embodiment of the present disclosure.

Further, when the same wireless power receiver 160 again accesses the wireless charging system 100 later to perform the wireless charging, the information on the wireless power receiver 160 corresponding to the wireless transmission efficiency stored in the memory unit will be received in the head unit 110 and information receiver 120. In this case, the controller 130 may select the mode having the highest wireless transmission efficiency among the plurality of different wireless charging modes based on the wireless transmission efficiency stored in the memory unit and may control the wireless power transmitting units 151, 152, 153, and 154 to wirelessly transmit power to the wireless power receiver 160 from which the information is transmitted by the selected wireless charging mode.

Consequently, in the case in which the wireless power receiver 160 supports the plurality of wireless charging modes, when the wireless charging system 100 for a variable charging mode according to the exemplary embodiment of the present disclosure determines by which mode power is wirelessly transmitted, the corresponding wireless power receiver 160 uses the wireless transmission efficiency stored in the memory unit based on the existing records to be able to wirelessly transmit power using the wireless charging mode having the highest efficiency.

Figure 2:
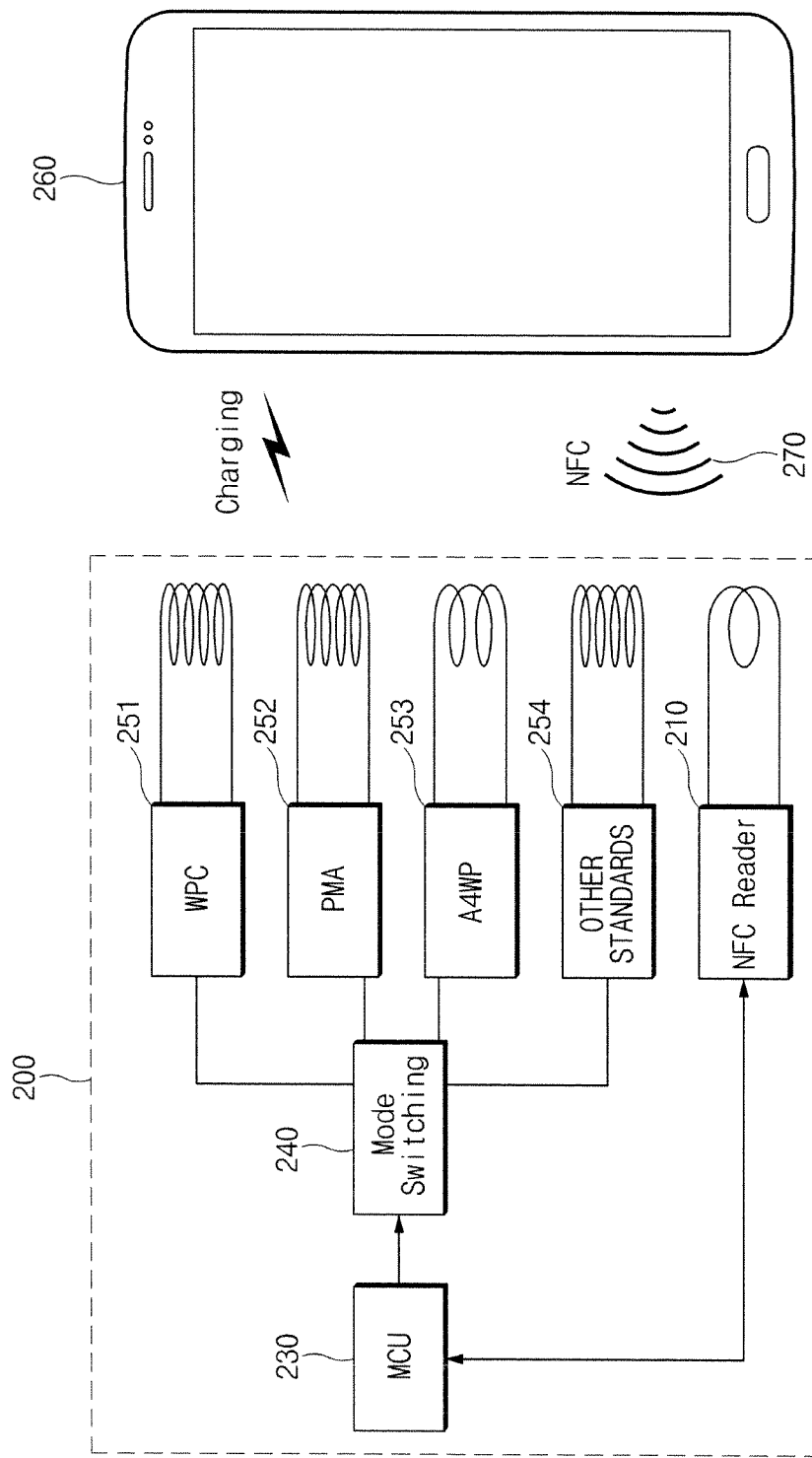
FIG. 2 is a block diagram illustrating a wireless charging system for a variable charging mode according to another exemplary embodiment of the present disclosure.

FIG. 2 is a block diagram illustrating a wireless charging system for a variable charging mode according to another exemplary embodiment of the present disclosure. Referring to FIG. 2, a wireless charging system 200 for a variable charging mode includes an NFC reader 210, charging mode switching unit 240, wireless power transmitting units 251, 252, 253, and 254, and a controller 230.

In this configuration, the charging mode unit 240, the wireless power transmitting units 251, 252, 253, and 254 and the controller 230 are the same as the wireless power transmitting units and the controller which are already described with reference to FIG. 1 and therefore the detailed description thereof will be omitted.

The wireless charging system 200 for a variable charging mode illustrated in FIG. 2 uses the NFC to receive the information on the wireless charging, which is supported by a wireless power receiver 260. To this end, the wireless charging system 200 for a variable charging mode illustrated in FIG. 2 may include the NFC reader 210. Further, the wireless power receiver 260 may also include or run applications that use the NFC 270 to transmit the information including its own wireless charging mode, and the like to the NFC reader 210.

The NFC reader 210 may transmit the information on the wireless charging mode of the wireless power receiver 260 that is received through the NFC 270 to the controller 230. The controller 230 is configured to control the charging mode unit 240, and the wireless power transmitting units 251, 252, 253, and 254 to wirelessly transmit power using the corresponding wireless charging mode based on the transmitted information.

That is, the wireless charging system 200 for a variable charging mode illustrated in FIG. 2 may use the NFC 270 without the connection of the separate wireless communication prior to wirelessly transmitting power to transmit the information on which mode the wireless power receiver 260 supports to the wireless charging system 200 and perform the wireless charging based on the information.

Further, when the charging mode corresponding to the information received through the NFC reader 210 is the A4WP and pairing of the A4WP fails, the wireless charging system 200 for a variable charging mode of FIG. 2 may wirelessly transmit power by the paring through the NFC 270 using the NFC reader 210 and applications included in the wireless power receiver 260.

Consequently, the wireless charging system 200 for a variable charging mode is configured to perform the wireless charging even though the user does not know which mode the wireless power receivers carried by him or her supports and is enough to maintain only the NFC 270 in a stand-by state at the time of a stand-by mode in which the wireless charging is not performed to be able to reduce stand-by power more than necessary.

As described above, according to the wireless charging system for a variable charging mode in accordance with the exemplary embodiments of the present disclosure, the wireless power transmitter may automatically transmit wirelessly power to the wireless power receiver carried by the user depending on the most efficient charging mode even though the user does not know the wireless charging mode which is supported by the wireless power receiver.

Hereinabove, although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims Accordingly, the scope of the present disclosure is not construed as being limited to the described exemplary embodiments but is defined by the appended claims as well as equivalents thereto. Considering the above contents, if the modifications and changes of the present disclosure belong to the range of the following claims and equivalents, the present disclosure is considered to include the changes and modifications of the present disclosure.

What is claimed is:

1. A wireless charging system for a variable charging mode, comprising:
   an information receiver configured to receive information about a wireless power receiver including a wireless charging mode that is supported by the wireless power receiver through a wireless communication connected to the wireless power receiver;
   wireless power transmitting units configured to wirelessly transmit power by a plurality of different wireless charging modes; and
   a controller configured to control the wireless power transmitting units to wireless transmit power by a wireless charging mode corresponding to the received information,
   wherein the wireless power receiver is a mobile terminal carried by a passenger of a vehicle, the information receiver includes an near field communication (NFC) reader in the vehicle, the controller is a micro controller unit (MCU) which is equipped in the vehicle, and the mobile terminal includes an application configured to use NFC communication to transmit information.

2. The wireless charging system according to claim 1, wherein the wireless power transmitting units include wireless power transmitters configured to wirelessly transmit power depending on at least two wireless charging modes of a wireless power consortium (WPC) mode, a power matters alliance (PMA) mode, and an alliance for wireless power (A4WP) mode, which are included in a wireless charging standard; and
   a switching unit configured to switch the wireless charging mode to one of the at least two wireless charging modes depending on a control of the controller.

3. The wireless charging system according to claim 2, wherein when the wireless charging mode switched by the switching unit is the WPC and the PMA, the wireless charging mode uses ping of in-band communication to sense whether the wireless power receiver contacts the wireless power transmitting units and a state of the wireless power receiver, and the wireless power transmitting units to wirelessly transmit power.

4. The wireless charging system according to claim 2, wherein when the wireless charging mode switched by the switching unit is the A4WP, the wireless charging mode uses Bluetooth low energy (BLE) to provide a communication between the wireless power receiver and the wireless power transmitting units.

5. The wireless charging system according to claim 1, wherein
   the information receiver further includes a head unit and a receiver, and
   the head unit transmits information received from the receiver to the MCU through a vehicle communication controller area network (CAN)/local interconnect network (LIN).

6. The wireless charging system according to claim 1, wherein the wireless communication connected to the wireless power receiver is a Bluetooth communication or a WiFi communication.

7. The wireless charging system according to claim 1, wherein the charging mode corresponding to the received information is A4WP, and
   when pairing of the A4WP fails, power is wirelessly transmitted by pairing through the NFC using the NFC reader and the application.

8. The wireless charging system according to claim 1, wherein when the wireless power receiver supports the plurality of different wireless charging modes,
   the controller controls the wireless power transmitting units to sequentially apply the plurality of different wireless charging modes based on preset priority to wirelessly transmit power to the wireless power receiver.

9. The wireless charging system according to claim 8, further comprising:
   a memory unit configured to store wireless transmission efficiency,
   wherein the controller is configured, based on the plurality of different modes, to calculate the wireless transmission efficiency of power wirelessly transmitted.

10. The wireless charging system according to claim 9, wherein when the information receiver receives the information on the wireless power receiver corresponding to the wireless transmission efficiency stored in the memory unit, the controller controls the wireless power transmitting units to wirelessly transmit power to the wireless power receiver by a wireless charging mode having highest wireless transmission efficiency among the plurality of different wireless charging modes based on the wireless transmission efficiency stored in the memory unit.

* * * * *